Dec. 28, 1954   H. SVANOE   2,698,225
SULFITE WASTE DISPOSAL
Filed Feb. 10, 1951
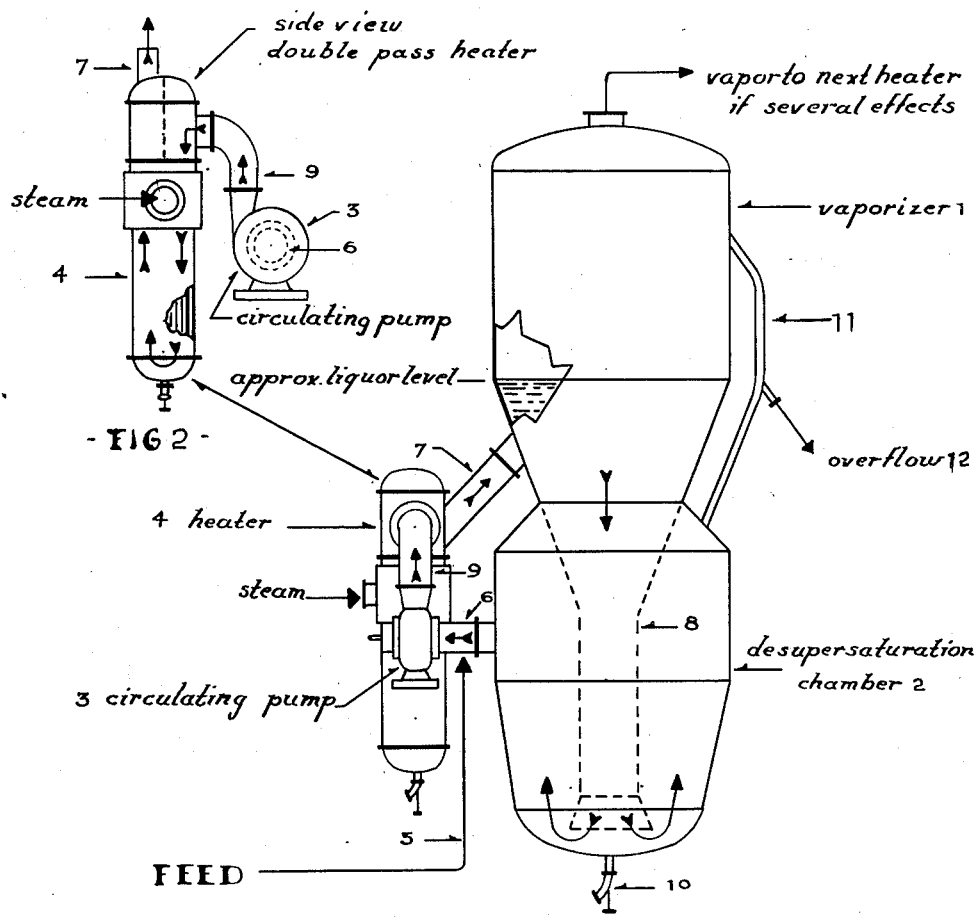
Hans Svanoe
INVENTOR.
BY
ATTORNEY.

United States Patent Office 2,698,225
Patented Dec. 28, 1954

2,698,225

SULFITE WASTE DISPOSAL

Hans Svanoe, Warren, Pa.

Application February 10, 1951, Serial No. 210,378

7 Claims. (Cl. 23—301)

This invention relates to the disposal of waste sulfite liquor of the wood pulp industry and more particularly relates to disposition of such liquors by concentration to supersaturation, crystallization and economical disposal of the concentrate.

Extended investigations of industrial wastes, such as sulfite liquors, and the development of methods for treating them are in progress at the present time because of the public concern over stream pollution. Coagulants, precipitating agents, settling beds, biological processes, and other means are under investigation to lower the Chemical Oxygen Demand of liquid waste material.

Biological methods of treatment are widely used on domestic sewage and to some extent on industrial waste. One form of treatment comprises intermittent spraying of clarified organic waste material on beds of stones coated with adhering bacterial slime. The bacteria feed on the organic matter and thus destroy it. In another form, air is passed through retention tanks in which the waste, containing suspended recovered bacterial accumulations in the form of sludge, is exposed. The capacity of such systems per unit volume of waste treated is low so that capital investment and ground area required are great. Of greater importance, however, is the limitation imposed by toxicity to the bacterial growth of the waste materials. Toxicity may be due to the nature of the materials to be treated or, in some cases, to their concentration. For small volume waste disposal, such systems can occasionally be used successfully. For the disposition of sulfite waste liquors, however, they are wholly inadequate. In 1948 alone, 2,811,000 short tons of sulfite pulp were produced. The waste liquor recovered from the blow pits aggregated 8.5 billion gallons in which was dissolved 3,000,000 tons of wood substances.

The enormity of this disposal problem is augmented by the high salt and organic content of these liquors and the difficulties encountered in concentration, removal of the salt and disposal of the organic matter. Attempts made heretofore to concentrate them by evaporation, followed by separation of the salt and incineration of the organic content of the residue, were faced with such formidable problems that one writer has stated, regarding the evaporation-incineration route, "it is not likely any economical answer will be found via such a process."

An object of this invention is to provide a process for the disposal of waste sulfite liquors. Another object is to provide a method of disposing of such waste liquors by a highly efficient evaporation, crystallization and incineration process. Still another object is to provide a process of supersaturating sulfite waste liquors while avoiding incrustation of those liquors by presenting for growth the necessary crystal surface to provide release of supersaturation. Other objects and advantages will hereinafter appear.

In accord with the invention, sulfite waste liquors are concentrated in any suitable manner, such as that employed in an evaporator-crystallizer, the evaporation being so regulated that deposits on heater tubes, evaporator surfaces, pump impellers and the like are substantially prevented by, inter alia, maintaining a suspension of calcium sulfate, or other suitable salt crystals, in the solution during the evaporation. With controlled amounts of crystals in the mother liquor, supersaturation is released in the form of crystal growth and nucleation, leaving a relatively desupersaturated solution to pass through the apparatus.

The invention will be more thoroughly understood by reference to the attached drawing which diagrammatically illustrates an apparatus in which the invention can be carried out. Fig. I shows diagrammatically, with a partially cut away section, an evaporator-crystallizer in which the waste sulfite liquor is concentrated. Fig. II is a side view of an external heater, with a partially cut away section, for evaporation of the waste from the waste sulfite liquor. The arrows shown on each figure flow with the fluids.

Fig. I shows in combination, vaporizer 1, desupersaturation chamber 2, circulating pump 3, and heater 4. Dilute waste sulfite liquor feed at 5 is introduced into the apparatus through feed pipe opening, not shown, suitably connected to pipe 6. The feed comes into contact in pipe 6 with circulating liquor concentrate and is passed with the concentrate, by circulating pump 3 and pipe 9, into heater 4 which is superheated, under the vacuum or pressure conditions used, by steam (as shown) or by any other suitable heating medium such as fuel, gas, oil, electric coils, or the heat from concentrated waste liquor incineration. From heater 4 the superheated mixture of feed and liquor concentrate is forced through pipe 7 into vaporizer 1 in which the mixture is subjected to vaporization at any desired pressure, and preferably at pressures between 900 and 50 mm. of Hg absolute. The liquor concentrate passes down into the restricted section 8 of the vaporizer 1, flows around the lower extremity thereof, which is spaced above the bottom of the desupersaturation chamber 2, and into the annular shaped chamber disposed about the restricted section 8 of the vaporizer 1. From the desupersaturation chamber 2 the liquid concentrate passes into pipe 6 and the cycle of operations is repeated. Overflow and discharge of concentrated liquor passes through pipes 11 and overflow pipe 12, draw-off pipe 10 being provided to discharge slurry from the desupersaturation chamber 2.

The process of the invention is conducted by evaporating sulfite waste liquor, having from about 7 to 15% by weight total solids (organic and inorganic) to a liquor concentrate having a concentration between about 50% and 65% by weight total solids. The evaporation may be conducted in a single effect evaporator, as shown, or in a suitable multiple effect evaporator system. In the single effect evaporation of Fig. I, the 7 to 15% by weight total solids feed is fed into the system via pipe 6 and forced by pump 3 into vaporizer 1 until approximately the liquid level shown is reached. Heat is then introduced into the feed, e. g. from superheated steam at a temperature between 215 to 240° F. or higher, the circulating pump 3 forcing the concentrating liquor through the cycle, the inlet feed being regulated to approximate the amount of vapor passing from the top of the vaporizer 1. When the desired degree of concentration is attained the concentrated liquor is withdrawn from the vaporizer 1 through pipe 11 and overflow pipe 12. The feed is then adjusted to balance the water evaporated and the product withdrawn. This liquor concentrate, after separating the crystals by settling out, filtration or otherwise, may be used as fuel to supply at least a portion of the heat required to evaporate the water from the sulfite liquor or may be used to provide heat for any other desired purpose. In accord with the invention the calcium sulfite and calcium sulfate are grown to maximum size, thereby allowing the major part of the crystalline solids to be settled or filtered out before the concentrated liquor is utilized in the burners. This greatly reduces fly ash troubles.

In starting up the process, calcium sulfate crystals, say from 50 to 150 U. S. standard mesh size, can be added from the outside, that is, when the system is started up with fresh liquor and no calcium sulfate is available in the system. If desired, a small tank with calcium sulfate slurry, containing about 50% of that salt, available from previous operations can be provided (not shown in the drawings) and such slurry can be pumped into the system whenever a fresh start is being made.

A preferred embodiment of the invention resides in the method of carrying out the concentration in order to avoid deposits on the crystallizer surfaces, heater surfaces or other parts of the apparatus. This is accomplished by control of the supersaturation which is responsible for the aforesaid undesirable results. Supersaturation is released by discharge to crystals which grow and nucleate, leaving a relatively desupersaturated liquor to pass through the apparatus. More specifically, crystals are suspended in the solution and in sufficient quantity to offer necessary crystalline surface for the release of supersaturation. It has been found that for every 100 lbs. per hour of crystals produced by evaporation, the quantity of crystals available for growth and nucleation must be at least 400 lbs. of suspended crystals to every 100 lbs. of crystals produced per hour.

A typical operation of the process is conducted in a plant producing 100 tons per day, calculated as dry cellulose pulp. The waste sulfite liquor from such a pulp contains normally from 100 to 120 tons, say about 110 tons, of dissolved organic and inorganic constituents that are divided, on a 110 ton basis, into about 100 tons of organic and about 10 tons of inorganic material. Of the latter about 8 tons are a mixture of calcium sulfate and calcium sulfite, the remaining two tons being other salts. During evaporation about 85% of the calcium sulfate and calcium sulfite are recovered as crystalline solids, i. e. about 7 tons per 100 tons per day of dry cellulose pulp.

In regard to the terminology used, it is assumed that the crystal forming solids are calcium sulfate although the main inorganic constituents in sulfite pulp liquors are calcium sulfate and calcium sulfite. However, for simplification the solids are referred to herein as calcium sulfate although, as a matter of fact, the sulfate itself, in the crystalline state, may be present as gypsum, hemihydrate or in the anhydrous form, depending on the temperature of the operation.

In addition to the suspension of a certain quantity of crystals (e. g. gypsum) in the solution, the supersaturated liquor should have sufficient time of contact with the solid in order to reduce effectively supersaturation. With the quantities of crystals available for growth indicated above, i. e. at least 400 lbs. of such crystals per 100 lbs. of crystals produced per hour, at least 40 gallons of liquor volume should be available in the system per 100 lbs. of water vaporized per hour. This is referred to in the specification and claims as desupersaturation volume. Using a ratio higher than 4 to 1 this volume may be correspondingly reduced, e. g. with a ratio of .8 to 1 the desupersaturation volume may be decreased to 30 gallons per 100 lbs. of water vaporized per hour.

A final requirement for maintaining freedom from deposition is adequate circulation and agitation, i. e. efficient contact between supersaturated liquors and solids. Means must accordingly be provided whereby the supersaturated liquor is brought into direct contact with the suspended crystalline solids. An efficient way to accomplish close contact is to provide for a relatively high rate of circulation, especially in the desupersaturation chamber 2. A rate of circulation equivalent to at least 25 gallons per minute per square foot of the total cross sectional area of the desupersaturation chamber should be used. Moreover, based on the amount of water vaporized, the amount of liquor in circulation, i. e. the total liquid volume in the system, should be between 30 and 60 gallons per 100 lbs. of water evaporated per hour.

The concentration is most efficiently conducted in a quadruple effect evaporation system in which four units similar to that illustrated in Fig. I are used. The feed for example, may, in such a system, be passed into pipe 6 of the third unit, the overflow of concentrated liquor from this unit being transferred from its overflow pipe 12 to pipe 6 of unit four and, in like manner, the concentrate from unit four transferred to unit two and from unit two to unit one. The concentrated liquor from overflow 12 of the first unit being the product. The steam from evaporation plus the water or condensate from heater 4 of the first unit are used to heat the liquor in heater 4 of the second unit. In a similar manner, and in accord with customary usage of multiple effect evaporators, maximum utilization of the heat is accomplished.

Due to the fact that sulfite liquor can be concentrated in accord with my process without crystal deposits, the addition of feed, to a multiple effect system, may be governed in such a way as to obtain maximum steam efficiency. Unsuccessful operations result when depositions of crystals occur and applicant's process not followed, for not only must flows be regulated to eliminate deposition but by so doing steam costs are inordinately increased.

Suspended calcium sulfate crystals, produced by the process of the invention, will be relatively small in size and such crystals can be carried with the overflow to the next unit in the multiple effect system. As the production of sulfate in different units will depend on solubility characteristics the excess sulfate may, if desired to maintain the prescribed ratio in that particular unit, be removed between the effects. The crystals obtained from sulfite liquor are generally small, having a bulk density (dry salt) of 32 lbs./cu. ft. (loose) and 48 lbs./cu. ft. (packed). The invention herein described contemplates evaporation of the sulfite liquor to a concentrated liquor of 50% to 65% which can be withdrawn from the system directly from overflow pipe 12. The economics of heat obtained by burning the concentrated liquor vs. value of crystals will determine the better method of disposal at any given time. Under certain circumstances it may be most profitable to separate crystals and also burn a portion or all of the concentrated liquor. In any event the principal function of the crystals is to release the supersaturation (created by concentration) which eliminates scale deposits.

Foaming may be encountered while starting up the process but can be easily stopped by the use of a small amount of a suitable antifoam.

The process of the invention is directed principally to the utilization of sulfite liquor of the paper and other pulp utilizing industries in such a manner that it can be disposed of without stream pollution. The invention, however, is applicable to the crystallization of sulfite pulp liquor for any purposes covered by the processes of appended claims.

1. In a process for the disposal of waste sulfite liquor containing 5% to 15% by weight of total organic and inorganic solids and in which the liquor during the concentration to from 50% to 65% by weight of total solids is recycled through zones of heating, vaporization, and desupersaturation, the steps which comprise circulating the waste sulfite liquor in a closed cycle through the heating, vaporization, and desupersaturation zones, inhibiting scale formation in the heating zone by passing into said zone a circulating concentrated slurry containing calcium sulfate crystals together with the dilute waste sulfite liquor feed, the circulating concentrated slurry liquor being less saturated than the circulating liquor introduced into the desupersaturation zone.

2. In a process for the disposal of waste sulfite liquor containing 5% to 15% by weight of total organic and inorganic solids and in which the liquor during the concentration to from 50% to 65% by weight of total solids is recycled through zones of heating, vaporization, and desupersaturation, the steps which comprise circulating the waste sulfite liquor in a closed cycle successively through heating, vaporization, and desupersaturation zones, feeding dilute waste sulfite liquor to be concentrated into a circulating aqueous concentrated slurry containing calcium sulfate crystals prior to passage of that slurry into the heating zone and inhibiting scale formation in said heating zone by passing into it the circulating concentrated slurry from the upper portion of the desupersaturation zone.

3. The process of claim 2 in which desupersaturation is released by the flow through the closed cycle of at least 400 pounds of salt crystals per 100 pounds of crystal growth per hour.

4. The process of claim 2 in which there flows through the cycle from about 30 to 65 gallons of water per 100 pounds of water evaporated per hour.

5. The process of claim 2 in which the evaporation in the zone of evaporation is at a rate of at least 25 gallons per minute per square foot of the total cross-sectional area of the desupersaturation zone.

6. In a process for the disposal of waste sulfite liquor containing 5% to 15% by weight of total organic and inorganic solids and in which the liquor during concentration to from 50% to 65% by weight of total solids is recycled through a zone of a vaporization and a zone of desupersaturation, the steps which comprise forcing the liquor, during its concentration to a liquor containing 50% to 65% by weight of total solids, into a vaporization zone whereby supersaturation of the liquor is maintained, passing the supersaturated liquor from the vaporization zone to a desupersaturation zone wherein the liquor is desupersaturated by crystal growth on the mass of crystals circulated within said zone, discharging from the upper portion of the desupersaturated zone a desupersaturated slurry liquor to the heating zone and after heating that liquor, repeating the cycle.

7. The process of claim 6 in which there is maintained in the cycle at least 400 pounds of salt crystals per 100 pounds of crystal growth per hour.

References Cited in the file of this patent

UNITED STATES PATENTS

| Number | Name | Date |
|---|---|---|
| 743,352 | Trump | Nov. 3, 1903 |
| 910,490 | Bock | Jan. 26, 1909 |
| 1,399,845 | Bull | Dec. 13, 1921 |
| 1,609,853 | Badger | Dec. 7, 1926 |
| 1,670,900 | Petersen | May 22, 1928 |
| 1,694,841 | Carr | Dec. 11, 1928 |
| 1,856,558 | Howard | May 3, 1932 |

OTHER REFERENCES

Sillen, "Formation of Hard Crusts During Evaporation of Sulfite Waste Liquors," Bulletin of Institute of Paper Chemistry, Appleton, Wis., 1930, vol. 18, page 123.

Tomlinson, "Economic Disposal of Waste Sulphide Liquor," Technical Ass'n Papers, 23d Series, page 448, Technical Ass'n of Pulp and Paper Industry, N. Y., 1940.